United States Patent

[11] 3,602,542

| [72] | Inventor | Horace C. Disston, Jr.<br>1091 North 8th Street, Camden, N.J. 08104 |
|---|---|---|
| [21] | Appl. No. | 797,819 |
| [22] | Filed | Feb. 10, 1969 |
| [45] | Patented | Aug. 31, 1971 |

[54] WEEDER
2 Claims, 7 Drawing Figs.

[52] U.S. Cl. .................................................. 294/50.7, 294/61
[51] Int. Cl. ................................................... A01b 1/16, A01d 9/06

[50] Field of Search ........................................... 294/50.7, 50, 50.5, 61; 47/37

[56] References Cited
UNITED STATES PATENTS

| 1,672,095 | 6/1928 | Schacht | 294/50.7 X |
| 1,466,168 | 8/1923 | Holton | 294/50.5 |
| 2,862,755 | 12/1958 | Gulden | 294/61 |

*Primary Examiner*—Richard L. Aegerter
*Assistant Examiner*—Douglas D. Watts
*Attorney*—Robert K. Youtie

ABSTRACT: A shank having a handgrip on one end and tines on the other end for removing a weed from the ground, and a stripper for ejecting the removed weed from the tines.

PATENTED AUG 31 1971 3,602,542
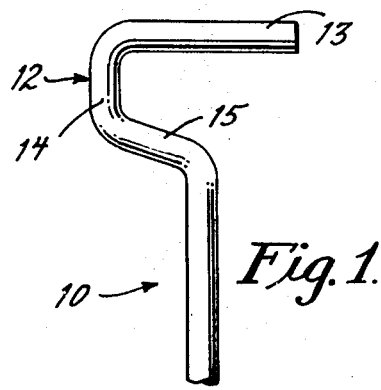
Fig.1.
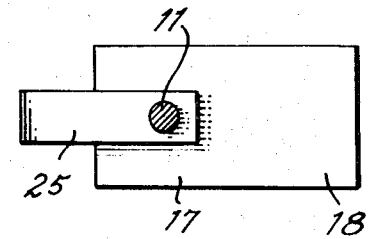
Fig.2.
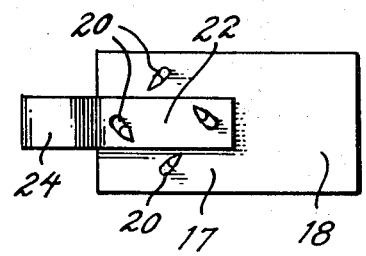
Fig.3.
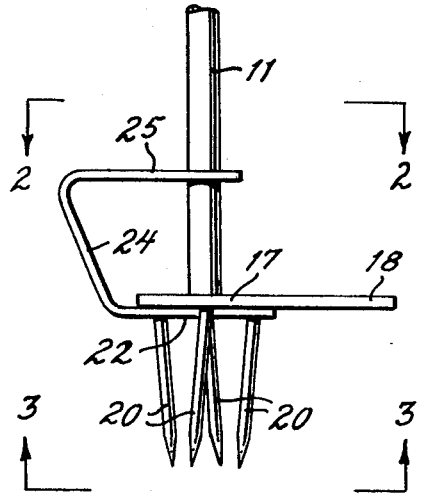
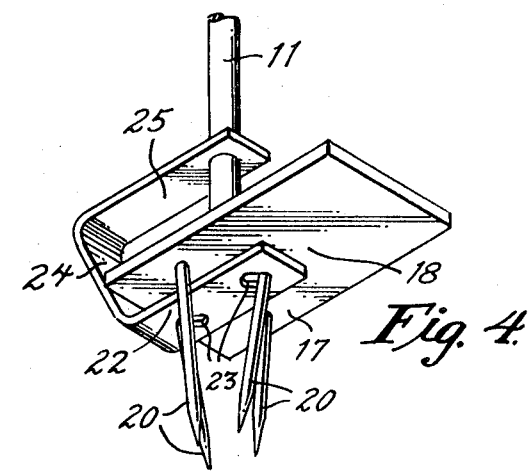
Fig.4.
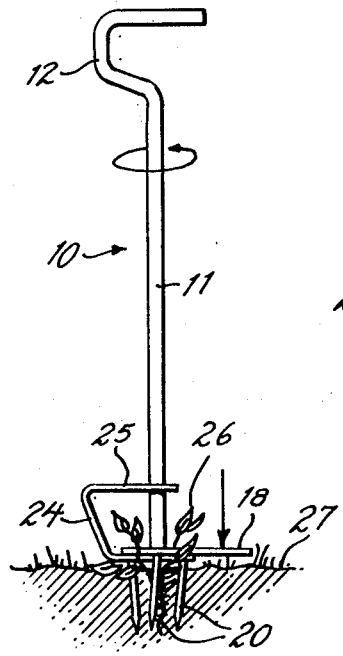
Fig.5.
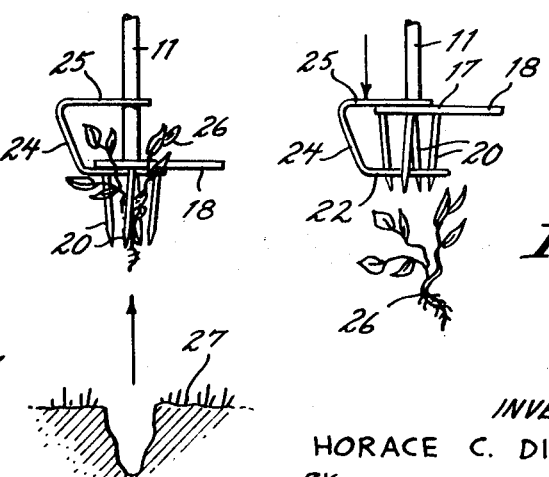
Fig.6.
Fig.7.
INVENTOR.
HORACE C. DISSTON
BY Robert K. Goulie
ATTORNEY

WEEDER

BACKGROUND OF THE INVENTION

While the prior art in the field of weeding devices is highly developed, previous weeding devices have been less than satisfactory, as requiring undue laborious effort, being overly complex and therefore readily subject to damage and malfunction in the necessary handling, and in being relatively expensive to manufacture and sell.

SUMMARY OF THE INVENTION

Accordingly, it is an important object of the present invention to provide a weeder or device for removing weeds from the ground, which is extremely simple to operate requiring but a minimum of effort and capable of dexterous operation without prior skill or experience.

It is another object of the present invention to provide a weeder having the advantageous characteristics mentioned in the preceding paragraph, which is highly effective in operation, quickly and easily removing weeds with a minimum of extraneous matter, and which is durable and reliable throughout a long useful life.

It is still a further object of the present invention to provide a weeding device of the type described which is extremely simple in construction, and capable of economic manufacture for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is an elevational view showing a weeder of the present invention.

FIG. 2 is a transverse sectional view taken generally along the line 2—2 of FIG. 1.

FIG. 3 is a lower end view taken generally along the line 3—3 of FIG. 1.

FIG. 4 is a partial bottom perspective view showing the underside of the weeder of FIG. 1.

FIG. 5 is an elevational view illustrating an initial stage in the weeding operation employing the instant device.

FIG. 6 is a partial elevational view showing an intermediate stage in the weeding procedure.

FIG. 7 is a partial side elevational view showing a final stage of the weeding operation

DESCRIPTION OF THE PREFERRED EMBODIMENT

Referring now more particularly to the drawings, and specifically to FIGS. 1–4 thereof, a weeder is there generally designated 10, and includes an elongate shaft or shank 11 which may be fabricated of rodstock, or the like. At the upper end of the shank or shaft 11 is provided suitable handgrip means, generally designated 12. The handgrip means 12 may consist of a transverse handle 13, in the nature of a crank, having depending from one end a longitudinal portion 14 extending parallel to and offset laterally from the shank 11. The offset portion 14 is connected, as by a transverse portion 15 to the upper end of shank 11. Thus, as illustrated in FIG 1, the handgrip means 12 may provide a transverse handle or crank and be fabricated integrally with the shank 11, as from a single piece of rodstock or the like.

Fixed to the opposite end of the shank 11, the lower or working end as seen in FIG. 1, may be an enlarged head in the form of a transverse plate 17. That is, the plate 17 may be fixedly secured, as by welding or other suitable means, to the lower end of shank 11, being disposed generally normal thereto. The plate or head 17 is of generally rectangular configuration, and includes a lateral extension 18 which defines a pusher, as will appear more fully hereinafter.

Depending from the underside of plate 17, extending generally longitudinally of and away from the shank 11, are a plurality of pins or tines 20, which are preferably four in number, but may be more or less, under certain circumstances. The tines or pins 20 each has its upper end fixedly secured to the underside of plate 17, as by welding, or other suitable securing means, and are arranged in a generally annular array about the axis of the shank 11. The pins or tines being four in number, are located in a generally rectangular or square arrangement. As best seen in FIG. 1, the tines or pins 20 are disposed in their fixed relation to converge slightly in the direction toward their free ends (away from the shank 11). Further, the disposition of the tines 20 is preferably, but not necessarily, in a spirallike or angularly extending relationship about the axis of the shank 11. This spirallike or angularly extending relationship may best be seen in the bottom view of FIG. 3. Preferably the tines 20 are of equal length, each terminating in a pointed free end or tip remote from the shank 11.

Located on the underside of the head or plate 17 is a stripper member or plate 22. The stripper member or plate 22 may extend across the space between a pair of opposed tines 20, being suitably slotted, as at 23 to slidably receive an opposed pair of tines. Thus, the stripper member or plate 22 is slidable from its position directly beneath and engaging the underside of head 17 longitudinally outwardly along the tines 20 to an extended position proximate to the free ends of the tines. Extending from one end of the stripper member or plate 22, and extending upwardly therefrom outwardly beyond the head 17, may be a strip portion 24. Extending from the strip portion 24 laterally inwardly toward and slidably receiving the shank 11 may be a stripper-actuator portion 25. That is, the stripper 22 and its extending actuator portion 25 may be integrally formed of suitable bar stock, being connected together by the intermediate region 24, for sliding movement as a unit longitudinally of the shank 11. For example, the stripper unit 22, 24 and 25 is slidable between the retracted position of FIGS. 1–6, and the extended position of FIG. 7, wherein the actuator extension 25 engages the upper side of head or plate 17 and the stripper part 22 is proximate to the free ends of the tines 20.

In operation, as best seen in FIG. 5, the weeder may be located over a weed 26 and the tines 20 impaled into the ground surface 27 astride the weed. By the convergent relationship of the tines 20, the weed and immediately adjacent soil tend to separate from the surrounding soil. Rotative movement of the weeder 10, as by manual rotation of the shank 11 by manipulating handle 13 further effects separation of the weed 20 and its immediate adjacent soil from the surrounding ground. This rotative manual action is facilitated by the spiral or angulate disposition of the tines 20, which serve to initiate the rotative movement. Full penetration of the tines is insured by depression of the pusher 18, as by the user placing one foot on the pusher to drive the head 20 home. This condition is shown in FIG. 5.

By mere upward withdrawal of the weeder device 10 from the position in FIG. 5 to the position of FIG. 6, the weed 26 and a minimum of associated soil are withdrawn from the surrounding ground 27.

Upward movement of the weeder 10 with the user's foot bearing downwardly on the stripper extension 25 effects extension of the stripper to the condition shown in FIG. 7. It will there be observed that the stripper effects quick and complete ejection of the weed 26 from between the tines. The weeder 10 is then ready for repetition of the above described operating procedure. Impaling of the tines 20 in a ground surface will shift the stripper 22 upwardly to its retracted position of FIG. 5, for repetition of the operating cycle.

From the foregoing, it is seen that the present invention provides a weeding device which fully accomplishes its intended object and is otherwise well adapted to meet practical conditions of manufacture, distribution and use.

Although the present invention has been described in some detail by way of illustration and example for purposes of clarity of understanding, it is understood that certain changes and modifications may be made within the spirit of the invention.

What is claimed is:

1. A weeder comprising an elongate shank, handgrip means at one end of said shank, at least three spaced tines fixedly located in an annular array and projecting generally longitudinally from the other end of said shank for impaling in the ground astride a weed, said tines being withdrawable from the ground for removal therewith of the weed, and a stripper plate interposed between said tines and having through openings receiving said tines to mount said plate for retractile and extensile movement longitudinally of the tines, said stripper plate being retractable upon impaling of said tines in the ground and extensible to eject a weed removed from the ground with said tines, said tines being convergent in their longitudinally outwardly extending relation to enhance weed removal from the ground, said stripper plate openings being elongate to slidably receive said tines in all positions of stripper plate movement, and said tines extending angularly to define a helix angle relative to the axis of said shaft, to effect rotative movement upon said impaling.

2. A weeder according to claim 1, said handgrip means comprising a crank to facilitate rotative shaft movement.